(12) United States Patent
Matsuno

(10) Patent No.: US 10,724,641 B2
(45) Date of Patent: Jul. 28, 2020

(54) FLOW PATH OPENING/CLOSING PORTION REPLACEMENT DEVICE

(71) Applicant: RIKOU Co., Ltd., Tokyo (JP)

(72) Inventor: Mitsuharu Matsuno, Tokyo (JP)

(73) Assignee: RIKOU Co., Ltd., Tokyo (JP)

( * ) Notice: Subject to any disclaimer, the term of this patent is extended or adjusted under 35 U.S.C. 154(b) by 0 days.

(21) Appl. No.: 16/661,503

(22) Filed: Oct. 23, 2019

(65) Prior Publication Data

US 2020/0132199 A1 Apr. 30, 2020

(30) Foreign Application Priority Data

Oct. 29, 2018 (JP) .................................. 2018-202885

(51) Int. Cl.
*F16L 55/18* (2006.01)
*F16K 1/34* (2006.01)
*F16L 29/00* (2006.01)

(52) U.S. Cl.
CPC .............. *F16K 1/34* (2013.01); *F16L 29/007* (2013.01)

(58) Field of Classification Search
CPC . F16K 1/34; F16K 1/422; F16K 43/00; Y10T 137/0486; Y10T 137/0441; Y10T 137/6109
See application file for complete search history.

(56) References Cited

U.S. PATENT DOCUMENTS

| 3,385,314 | A | * | 5/1968 | Thompson | ............ | F16L 55/105 |
| | | | | | | 137/318 |
| 4,271,870 | A | * | 6/1981 | Butler | ................... | F16L 55/105 |
| | | | | | | 137/318 |
| 5,063,957 | A | * | 11/1991 | Yano | ....................... | F16L 21/04 |
| | | | | | | 137/15.09 |
| 5,577,528 | A | * | 11/1996 | Saha | ....................... | F16L 55/18 |
| | | | | | | 137/15.08 |
| 6,263,896 | B1 | * | 7/2001 | Williams | .................. | F16K 7/10 |
| | | | | | | 137/15.15 |
| 2003/0150489 | A1 | * | 8/2003 | McAtarian | .............. | G01M 3/04 |
| | | | | | | 137/312 |

(Continued)

FOREIGN PATENT DOCUMENTS

| JP | 2003-278984 A | 10/2003 |
| JP | 2011-144844 A | 7/2011 |

(Continued)

*Primary Examiner* — Reinaldo Sanchez-Medina
(74) *Attorney, Agent, or Firm* — Studebaker & Brackett PC

(57) ABSTRACT

The flow path opening/closing portion replacement device comprises a first enclosing portion having a first opening and a shutter, and enclosing, in a state where the shutter has closed the first opening, an end portion of a converging pipe through which a fluid passes and a valve which is attached to the end portion; a second enclosing portion having a detachable member enabling the valve to be detached and a second opening which can be contiguous with the first opening and enabling removal/insertion of the detachable member, and enclosing the valve together with the first enclosing portion in a contiguous opening state in which the first opening and the second opening are contiguous, wherein, in a state where the second enclosing portion has enclosed the valve together with the first enclosing portion in the contiguous opening state, the valve can be replaced by the detachable member.

5 Claims, 13 Drawing Sheets

(56) References Cited

U.S. PATENT DOCUMENTS

2006/0289064 A1* 12/2006 Gill .................. F16L 37/002
                                                137/315.01

FOREIGN PATENT DOCUMENTS

| JP | 2012-215287 A | 11/2012 |
| JP | 2018-128140 A | 8/2018 |
| JP | 6399376 B1 | 10/2018 |

* cited by examiner

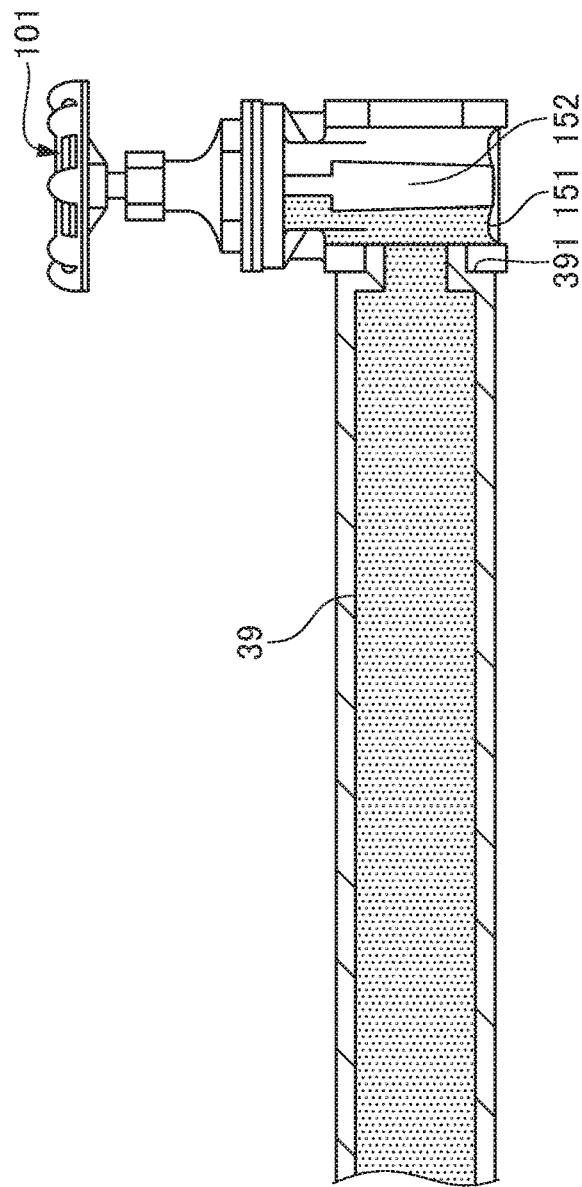
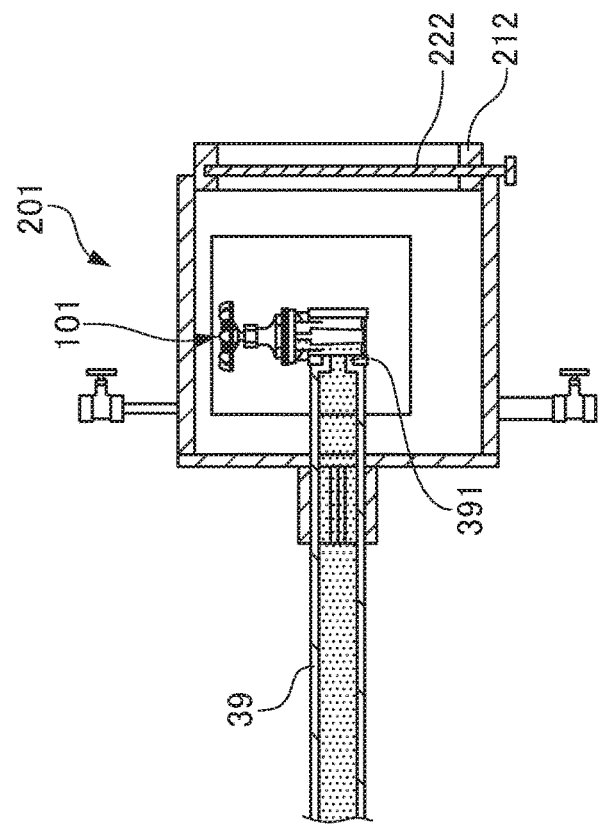

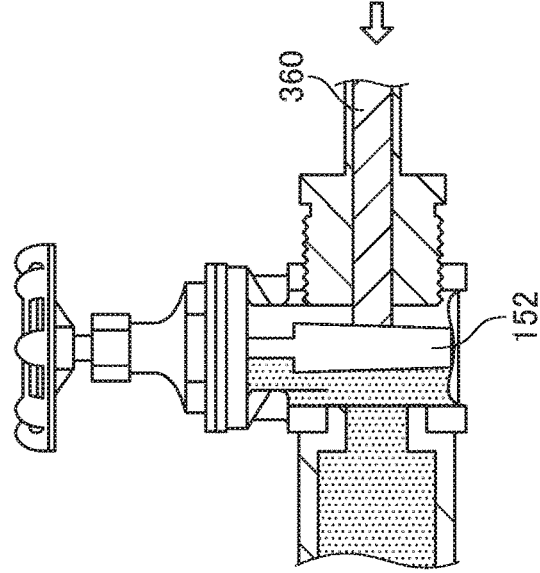
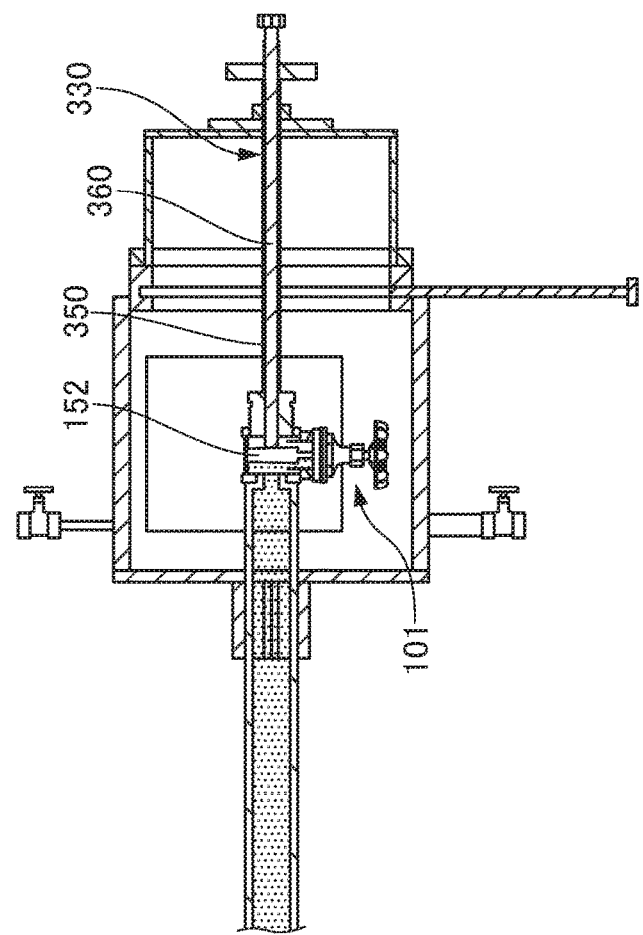
FIG. 9A
FIG. 9B

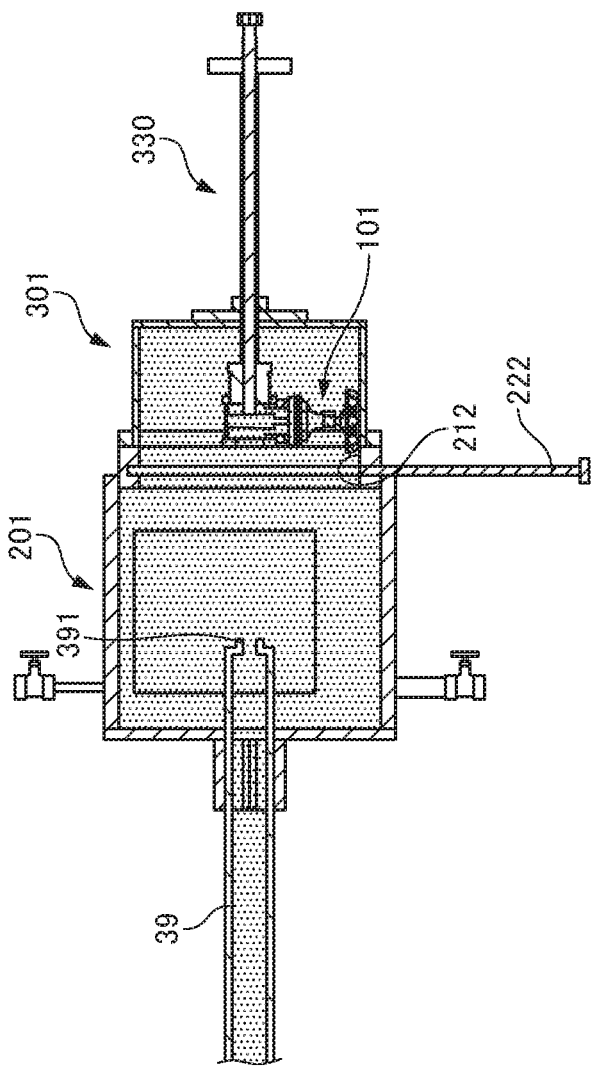
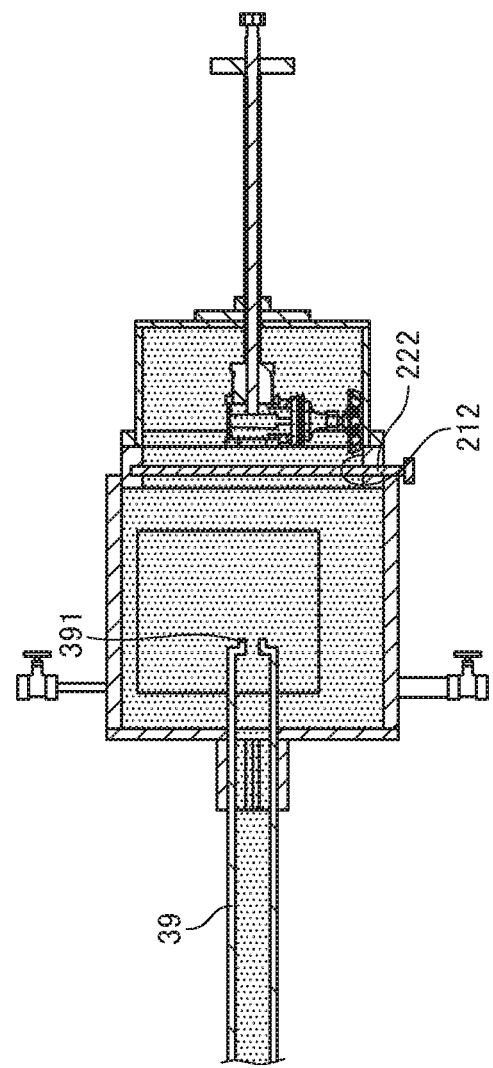
FIG. 10A
FIG. 10B

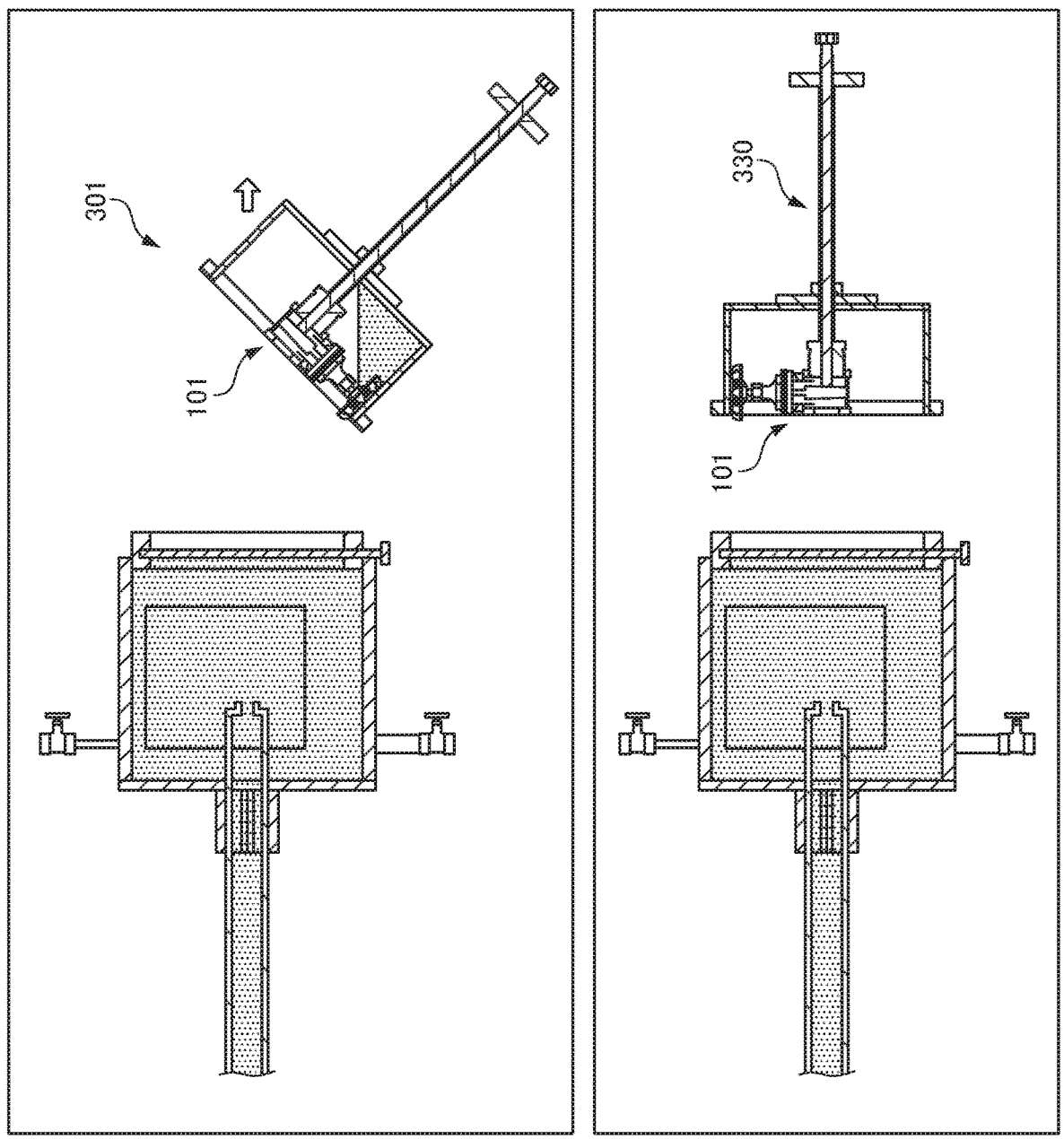

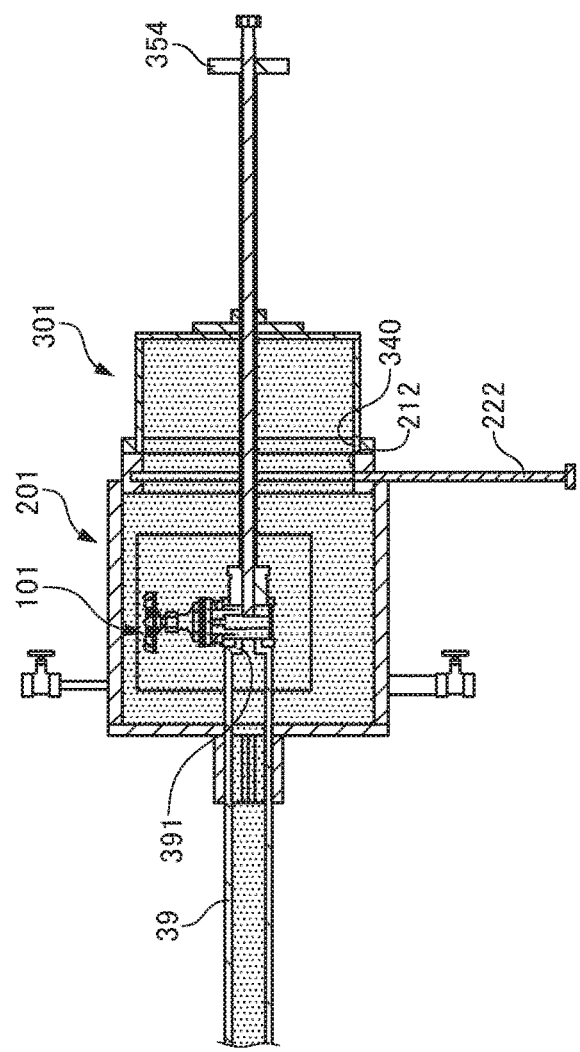
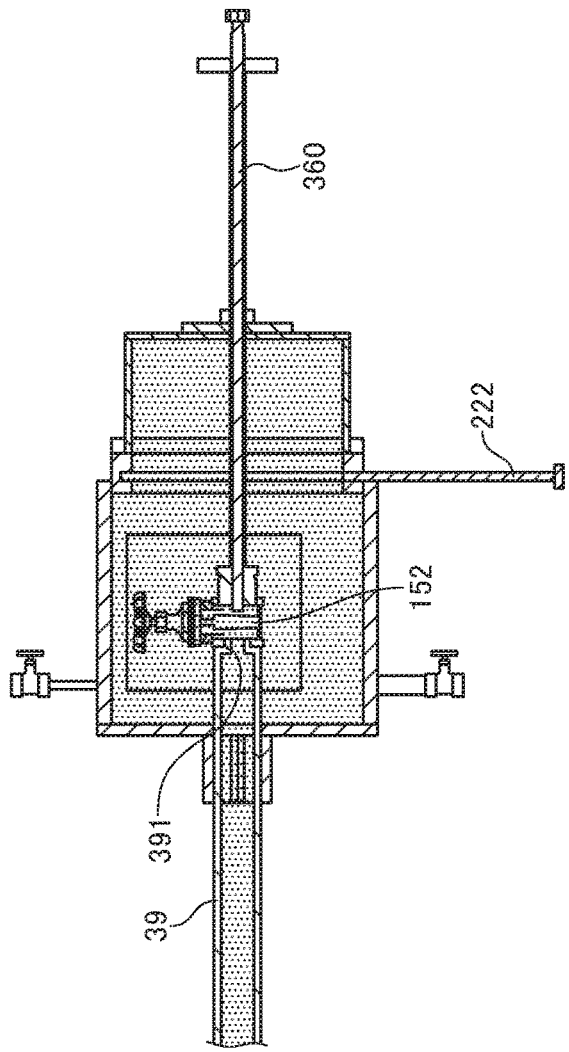
FIG. 12A
FIG. 12B

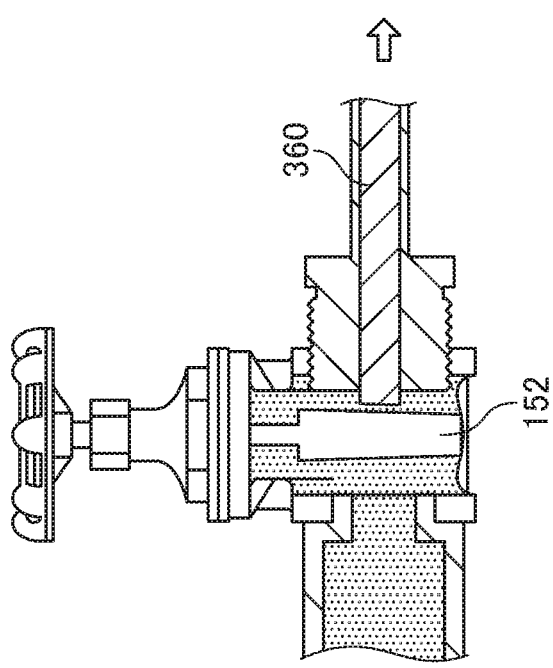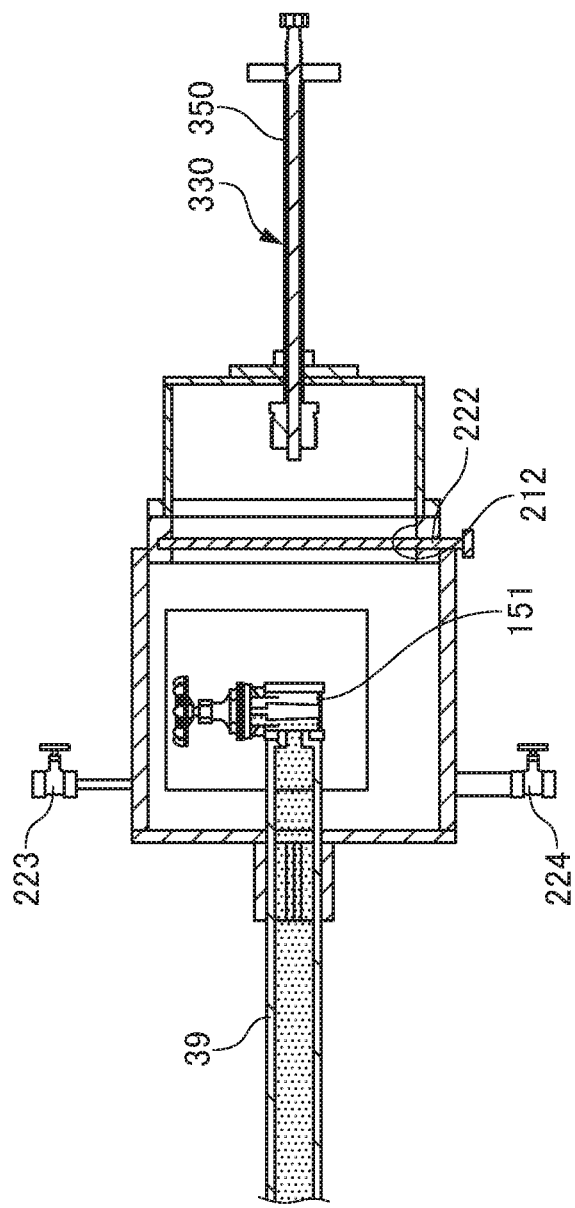
FIG. 13A
FIG. 13B

FLOW PATH OPENING/CLOSING PORTION REPLACEMENT DEVICE

This application is based on and claims the benefit of priority from Japanese Patent Application No. 2018-202885, filed on 29 Oct. 2018, the content of which is incorporated herein by reference.

BACKGROUND OF THE INVENTION

Field of the Invention

The present invention relates to a flow path opening/closing portion replacement device for replacing a flow path opening/closing portion which is attached to an end portion of piping enabling passage of a fluid and opens/closes a flow path of the piping.

Related Art

In a building such as an apartment block, a configuration for drawing up supplied water to each floor of the building is provided, and Patent Literature 1 is disclosed as literature relating to such a configuration. Patent Literature 1 discloses a configuration in which supplied water supplied to a water receiving tank is drawn up to each floor of the building by means of a water lifting pump. In addition, Patent Literature 1 discloses piping (converging pipe, mid-stage parallel pipe) which is connected to a replaceable pump unit, and discloses a flow path opening/closing portion (valve) which is connected to such piping. A flow path opening/closing portion of this kind sometimes needs to be replaced at the same time as plumbing work to replace a pump unit.

Patent Document 1: Japanese Patent No. 6399376

SUMMARY OF THE INVENTION

However, because the flow path opening/closing portion stops a fluid (supplied water) in the piping from being discharged, the fluid (supplied water) is discharged wastefully at the same time the flow path opening/closing portion is removed.

Therefore, an object of the present invention is to provide a flow path opening/closing portion replacement device which reduces the amount of a fluid discharged from piping when an existing flow path opening/closing portion is being exchanged for another flow path opening/closing portion in a state where the flow path opening/closing portion is stopped from discharging the fluid in the piping.

(1) The present invention relates to a flow path opening/closing portion replacement device (500), comprising: a first enclosing portion (201) having a first opening (212) and a shutter (222) capable of opening/closing the first opening (212), and enclosing, in a state where the shutter (222) has closed the first opening (212), an end portion of piping (39) enabling a fluid to pass and a flow path opening/closing portion (101) which is attached to the end portion (391) of the piping (39) and opens/closes a flow path (151) of the piping (39); a second enclosing portion (301) having a detachable member (330) enabling the flow path opening/closing portion (101) to be detached and a second opening (340) which can be contiguous with the first opening (212) and enabling removal/insertion of the detachable member (330), and enclosing the flow path opening/closing portion (101) together with the first enclosing portion (201) in a contiguous opening state in which the first opening (212) and the second opening (340) are contiguous, wherein, in a state where the second enclosing portion (301) has enclosed the flow path opening/closing portion (101) together with the first enclosing portion (201) in the contiguous opening state, an existing flow path opening/closing portion (101) can be replaced with another flow path opening/closing portion (101) by the detachable member (330).

(2) in the flow path opening/closing portion replacement device (500) of (1), the flow path opening/closing portion (101) includes a flow path (151) and a valve body (152) that opens/closes the flow path (151), the detachable member (330) includes a tube section (350) and an axial portion (360) which is inserted into an interior of the tube section (350) and enables a protrusion distance from a tip portion of the tube section (350) to be increased, the tube section is fixed to the flow path (151), and, when the detachable member (330) and the flow path opening/closing portion (101) rotate integrally while the axial portion (360) is made to press the valve body (152) by increasing the protrusion distance at which the axial portion (360) protrudes from the tip portion of the tube section (350), the flow path opening/closing portion (101) can be removed from the piping (39).

(3) In the flow path opening/closing portion replacement device (500) of (2), a first female thread portion (154) may be provided on an inner face of the flow path (151), a first male thread portion (355) capable of being threaded into the first female thread portion (154) may be provided on an outer face of the tip portion of the tube section (350), a second female thread portion (354) may be provided on the inner face of a rear end portion of the tube section (350), and a second male thread portion (361) capable of being threaded into the second female thread portion (354) may be provided on the outer face of a rear end portion of the axial portion (360).

(4) A method for using a flow path opening/closing portion replacement device according to any of (1) to (3) may comprise an enclosing step of enclosing the end portion (391) and the flow path opening/closing portion (101) by the first enclosing portion (201) in a state where the shutter (222) has closed the first opening (212); a flow path opening/closing portion removal step of opening the shutter (222) after making the second opening (340) contiguous with the first opening (212), causing the tip side of the detachable member (330) to move from an interior of the second enclosing portion (301) to an interior of the first enclosing portion (201), and removing the existing flow path opening/closing portion (101) from the end portion (391) of the piping (39) by moving the flow path opening/closing portion (101) from the end portion (391) of the piping (39) to the detachable member (330); a flow path opening/closing portion extraction step of causing an existing flow path opening/closing portion (101) and the tip side of the detachable member (330) to be retracted to the second enclosing portion (301) in a state where the interiors of the first enclosing portion (201) and the second enclosing portion (301) are filled with a fluid that passes through the open piping (39), withdrawing the existing flow path opening/closing portion (101) and the second enclosing portion (301) from the first enclosing portion (201), and extracting the existing flow path opening/closing portion (101) from the interior of the first enclosing portion (201) to an exterior of the first enclosing portion (201); an insertion step of attaching another flow path opening/closing portion (101) which is interchangeable with the flow path opening/closing portion (101) to the tip side of the detachable member (330) or of another detachable member (330) which is interchangeable with the detachable member (330), opening the shutter (222) after making the second opening (340) contiguous with the first opening (212), and inserting the other flow path opening/closing portion (101) from the interior of the second enclosing portion (301) to the interior of the first enclosing portion (201); a flow path opening/closing portion attachment step of attaching the other flow path opening/closing portion (101) to the end portion (391) of the piping (39); and an enclosure release step of releasing the enclosure by causing the tip side of the detachable member (330) to be retracted from the end portion (391) of the piping (39) and removing the first enclosing portion (201) and the second enclosing portion (301).

(5) The present invention relates to a method for replacing a flow path opening/closing portion, comprising: an enclosing step of enclosing an end portion (391) of piping enabling a fluid to pass and an existing flow path opening/closing portion (101) which is attached to the end portion (391) of the piping (39) and opens/closes a flow path (151) of the piping (39) by an enclosing portion (201) having a space for performing provisional work; a flow path opening/closing portion removal step of removing the flow path opening/closing portion (101) from the end portion (391) of the piping (39); a flow path opening/closing portion extraction step of extracting an existing flow path opening/closing portion (101) from an interior of the enclosing portion (201) to an exterior of the enclosing portion (201) in a state where the interior of the enclosing portion (201) is filled with the fluid that passes through the open piping (39); a flow path opening/closing portion insertion step of inserting another flow path opening/closing portion (101), which is interchangeable with the existing flow path opening/closing portion (101), to the interior of the enclosing portion (201) while the interior of the enclosing portion (201) remains filled with the fluid; a flow path opening/closing portion attachment step of attaching the other flow path opening/closing portion (101) to the end portion (391) of the piping (39); and an enclosure release step of releasing the enclosure by removing the enclosing portion (201).

According to the present invention, it is possible to provide a flow path opening/closing portion replacement device which reduces the amount of a fluid discharged from piping when an existing flow path opening/closing portion is being exchanged for another flow path opening/closing portion in a state where the flow path opening/closing portion is stopped from discharging the fluid in the piping.

BRIEF DESCRIPTION OF THE DRAWINGS

FIG. 6A is a cross-sectional view of piping and a valve.

FIG. 6B is a cross-sectional view illustrating a state in which the piping and valve are enclosed by a first enclosing portion.

FIG. 9A is an enlarged cross-sectional view of FIG. 8B.

FIG. 9B is a cross-sectional view illustrating a step of removing a flow path opening/closing portion by rotating the tube section of the second enclosing portion.

FIG. 10A is a cross-sectional view illustrating a state in which the second enclosing portion and flow path opening/closing portion have been moved in a direction away from the piping.

FIG. 10B is a cross-sectional view illustrating a state in which the first opening has been closed by moving the shutter.

FIG. 11A is a cross-sectional view illustrating a state in which the second enclosing portion has been removed from the first enclosing portion.

FIG. 11B is a cross-sectional view illustrating a step of attaching the second enclosing portion, which has a new flow path opening/closing portion attached thereto, to the first enclosing portion.

FIG. 12A is a cross-sectional view illustrating a state in which the flow path opening/closing portion, which is attached to the second enclosing portion, is engaged with the flow path of the valve.

FIG. 12B is a cross-sectional view illustrating a state in which the axial portion of the second enclosing portion has been separated from the valve body of the valve.

FIG. 13A an enlarged cross-sectional view of FIG. 12B.

FIG. 13B is a cross-sectional view illustrating a state in which the flow path opening/closing portion has been removed from the piping.

DETAILED DESCRIPTION OF THE INVENTION

A water supply system which the use of a flow path opening/closing portion replacement device according to one embodiment of the present invention is directed toward is described hereinbelow with reference to the drawings.

(Overall Configuration of Water Supply System)

Figure 1:
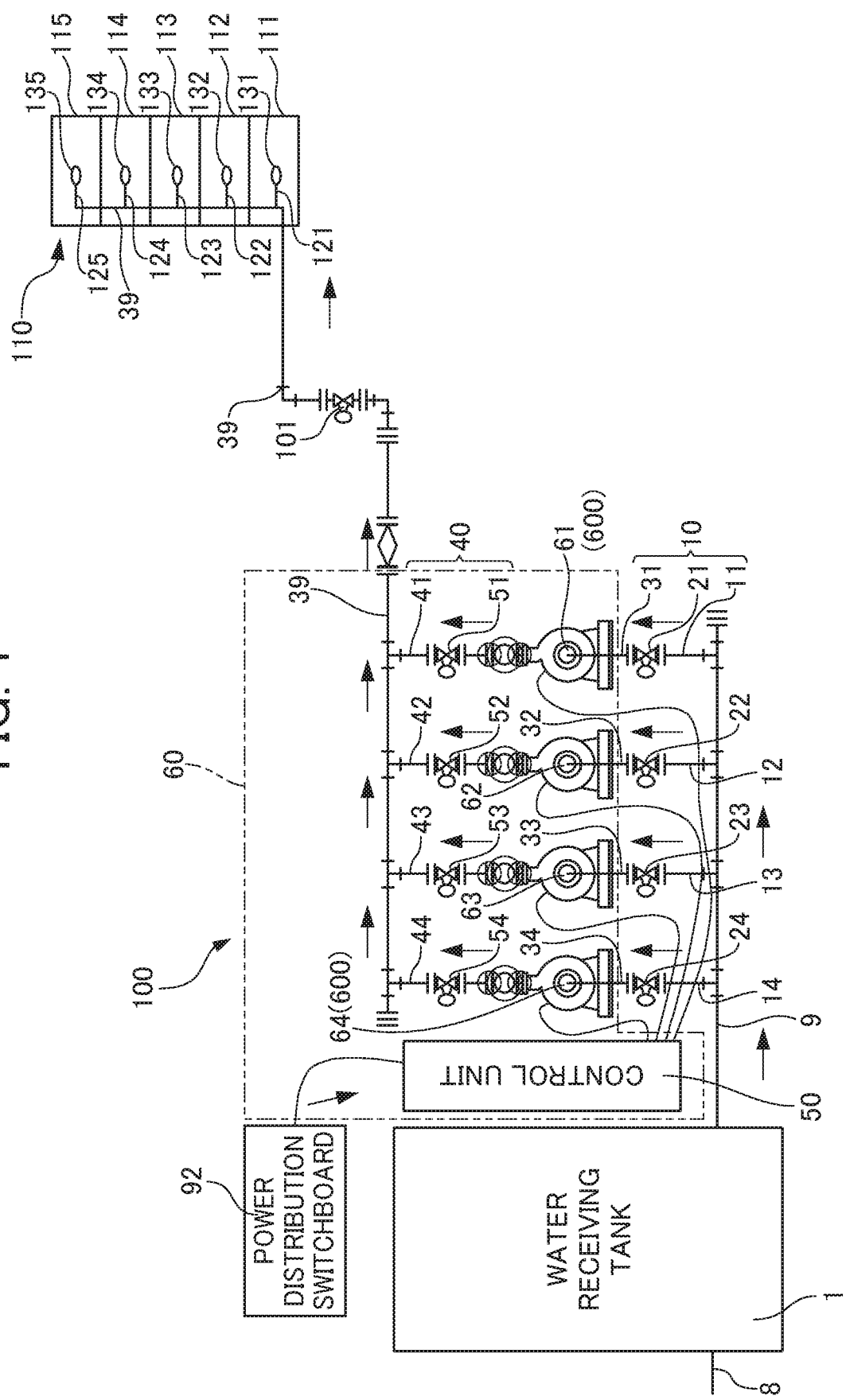
FIG. 1 is a schematic diagram illustrating a water supply system which the use of a flow path opening/closing portion replacement device according to one embodiment of the present invention is directed toward.

FIG. 1 is a schematic diagram illustrating a water supply system 100 which the use of a flow path opening/closing portion replacement device 500 according to one embodiment of the present invention is directed toward. As illustrated in FIG. 1, the water supply system 100 comprises a water receiving tank 1 as a water storage tank, a pump group 600, a control unit 50, a first-stage water supply pipe group 10, a latter-stage water supply pipe group 40, branch pipes 121 to 125, and faucets 131 to 135. In the present embodiment, the pump group 600, latter-stage water supply pipe group 40, and control unit 50 are combined into a unit to constitute a pump unit 60.

(Water Receiving Tank)

The water receiving tank 1 is a tank for storing supplied water which is drawn from a water supply drawing pipe 8.

The water receiving tank 1 stores water in an amount which is ⅓ to ½ of the daily water usage amount of a building 110.

(Pump Group)

The pump group 600 includes pumps 61, 62, 63, and 64 as a plurality of pumps provided in parallel. The pumps 61, 62, 63, and 64 operate according to the amount of water used by the residents of the apartment block. For example, when a minimum amount of water is used, one pump is driven, and when a maximum amount of water is used, three pumps are driven. The pumps 61, 62, 63, and 64 are driven in rotation and controlled such that one of the four pumps assumes a non-driven state as a backup. The pump group 600 is applied to the water supply system 100 (a pressurized water supply system) which directly supplies water from the water receiving tank 1 to the faucets 131 to 135 without using an elevated water tank, and is therefore also called a pressurized water-supply pump.

The control unit 50 is a part which adjusts the amount of supplied water passing through the plurality of pumps 61 to 64 by controlling the driving of the plurality of pumps 61 to 64. The control unit 50 is connected by means of wiring to a power distribution switchboard 92, and is connected by means of wiring to the plurality of pumps 61 to 64, respectively. Note that the power distribution switchboard 92 also includes a power supply function for supplying power to the plurality of pumps 61 to 64.

(First-Stage Water Supply Pipe Group)

The first-stage water supply pipe group 10 refers to an assembly of constituent members (pipes, valves, and the like) which cause water to pass from the water receiving tank 1 to the plurality of pumps 61 to 64. The first-stage water supply pipe group 10 comprises, in order starting upstream, a connecting pipe 9, a plurality of first-stage parallel pipes 11 to 14, a plurality of first-stage valves 21 to 24, and a plurality of mid-stage parallel pipes 31 to 34.

The connecting pipe 9 is a pipe connecting upstream end portions of the plurality of first-stage parallel pipes 11 to 14. The plurality of first-stage parallel pipes 11 to 14 are pipes which are arranged in parallel and correspond to the plurality of pumps 61 to 64, respectively. The upstream end portions of the first-stage parallel pipes 11 to 14 are connected to the connecting pipe 9, and the downstream end portions of the first-stage parallel pipes 11 to 14 are connected to the first-stage valves 21 to 24. The first-stage parallel pipes 11 to 14 cause supplied water, which diverges from the connecting pipe 9, to pass so as to flow into the plurality of pumps 61 to 64, respectively.

The plurality of first-stage valves 21 to 24 are arranged at the downstream end portions of the first-stage parallel pipes 11 to 14. The plurality of first-stage valves 21 to 24 are manually operated so as to open and close the plurality of first-stage parallel pipes 11 to 14, respectively.

The plurality of mid-stage parallel pipes 31 to 34 are pipes which are arranged in parallel and correspond to the plurality of pumps 61 to 64, respectively. The upstream end portions of the mid-stage parallel pipes 31 to 34 are connected to the plurality of first-stage valves 21 to 24, respectively, and the downstream end portions of the mid-stage parallel pipes 31 to 34 are connected to the inlets of the pumps 61 to 64. The mid-stage parallel pipes 31 to 34 are configured to be detachable from the first-stage valves 21 to 24. When the pump unit 60 is removed, the mid-stage parallel pipes 31 to 34 of the pump unit 60 are isolated from the first-stage valves 21 to 24.

(Latter-Stage Water Supply Pipe Group)

The latter-stage water supply pipe group 40 refers to an assembly of constituent members (pipes, valves, and the like) which cause water to pass from the plurality of pumps 61 to 64 to the space partition portions 111 to 115 on each floor which are used as a plurality of water supply destinations. The latter-stage water supply pipe group 40 comprises a plurality of latter-stage parallel pipes 41 to 44, a plurality of latter-stage valves 51 to 54, and a converging pipe 39.

The plurality of latter-stage parallel pipes 41 to 44 are pipes which are arranged in parallel and correspond to the plurality of pumps 61 to 64, respectively. The upstream end portions of the latter-stage parallel pipes 41 to 44 are connected to the outlets of the plurality of pumps 61 to 64, and the downstream end portions of the latter-stage parallel pipes 41 to 44 are connected to the converging pipe 39.

The plurality of latter-stage valves 51 to 54 are arranged midway along the latter-stage parallel pipes 41 to 44. The plurality of latter-stage valves 51 to 54 are manually operated so as to open and close the plurality of latter-stage parallel pipes 41 to 44, respectively.

The converging pipe 39 used as piping is a pipe that enables the convergence and passage of flowing water which is a fluid that passes through the plurality of latter-stage parallel pipes 41 to 44. The converging pipe 39 is disposed and enables communication inside and outside the pump unit 60. Therefore, when the pump unit 60 is removed, the converging pipe 39 is isolated inside and outside the pump unit 60. A latter-stage detour pipe 72 (see FIG. 2) is then attached to the converging pipe 39 disposed outside the pump unit 60. In addition, the converging pipe 39 has a part which extends vertically from the first floor of the building 110 to higher floors thereof downstream of a snap tap attachment part 139. Inside the vertically extending part of the converging pipe 39, water flows upward under the hydraulic pressure applied by the plurality of pumps 61 to 64.

(Branch Pipes)

Branch pipes 121 to 125 branch from the converging pipe 39 toward the plurality of space partition portions 111 to 115 of the building 110. Note that the plurality of space partition portions 111 to 115 stand in a vertical direction within the building 110. The space partition portions 111 to 115 refer to configurations enclosed by a floor, walls and a ceiling plate, and refer to a configuration which is enclosed by walls, a floor, and a ceiling which enclose a dwelling space in which a person dwells, a configuration which is enclosed by walls, a floor, and a ceiling which enclose a residential space where a person is, and a configuration of a whole house where a person dwells, or the like. The space partition portions 111 to 115 may be configured from one room or from a plurality of rooms.

(Faucets)

Faucets 131 to 135 are attached to the end portions of branch pipes 121 to 125. Faucets 131 to 135 have a tap (not shown) from which water is discharged by turning the tap in one direction, and the water is stopped by turning the tap in the other direction.

(Position of Water Supply System)

Note that the water supply system 100 described previously is disposed adjacent, to the space partition portion 111 in the first floor part of the building 110, for example. Although the water supply system 100 is shown in FIG. 1 as the exterior of the building 110 for the sake of mainly describing the configuration of the water supply system 100, the water supply system 100 is actually disposed in the interior of the building 110.

Figure 2:
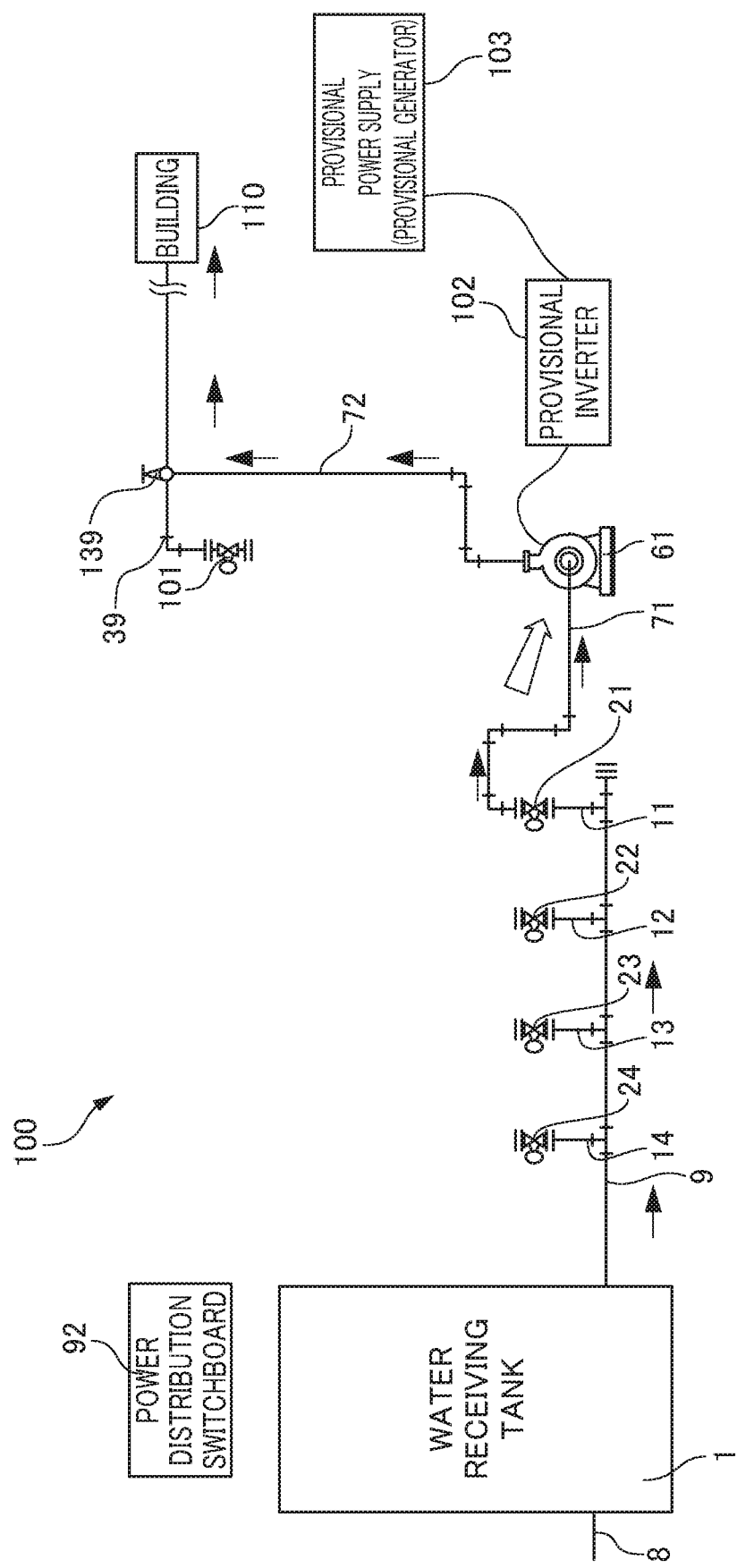
FIG. 2 is a schematic diagram illustrating a water supply system directly before using the flow path opening/closing portion replacement device according to one embodiment of the present invention.

In the foregoing water supply system 100, an operator uses a flow path opening/closing portion replacement device 500 in a state where the pump unit 60 has been removed, as illustrated in FIG. 2. The process of transitioning from the state of FIG. 1 to the state of FIG. 2 will be described on the basis of the following specified pump removal step, provisional pump connection step, and first pump unit removal step.

(Specified Pump Removal Step)

FIG. 2 is a schematic diagram illustrating a water supply system 100 directly before using the flow path opening/closing portion replacement device 500 according to one embodiment of the present invention. As illustrated in FIG. 2, the operator selects a specified pump (provisional pump) 61 among the plurality of pumps 61 to 64 as a specified pump. The operator closes the first-stage valve 21 and the latter-stage valve 51 for pump 61 to stop the passage of water through the first-stage parallel pipe 11, mid-stage parallel pipe 31, and latter-stage parallel pipe 41 for pump 61. The operator removes pump 61 and the mid-stage parallel pipe 31 from the first-stage valve 21 and latter-stage parallel pipe 41 for pump 61.

(Provisional Pump Connection Step)

The operator places the pump 61 serving as a provisional pump in a different position from the position of the pump unit 60. The power supply of pump 61 when the same is used as a provisional pump is connected to a different power supply from the power supply for pumps 62 to 64. A provisional inverter 102 and provisional power supply 103 (see FIG. 2) are used for the provisional pump. Note that a provisional generator may also be used instead of the provisional power supply 103. If there is a different, power supply for a fire hydrant, or the like in the vicinity of the power distribution switchboard 92, this power supply may also be used for the provisional pump.

The operator connects the first-stage valve 21 for pump 61 to the inlet of pump 61 serving as a provisional pump by means of a first-stage detour pipe 71. The operator connects the outlet of pump 61 which serves as a provisional pump to the part (that is, the snap tap attachment part 139) of the converging pipe 39 further downstream than the latter-stage parallel pipes 41 to 44 by means of the latter-stage detour pipe 72.

(First Pump Unit Removal Step)

The operator removes the pump unit 60 having the pumps 62 to 64 illustrated in FIG. 2.

(Flow Path Opening/Closing Portion and Flow Path Opening/Closing Portion Replacement Device)

Figure 3:
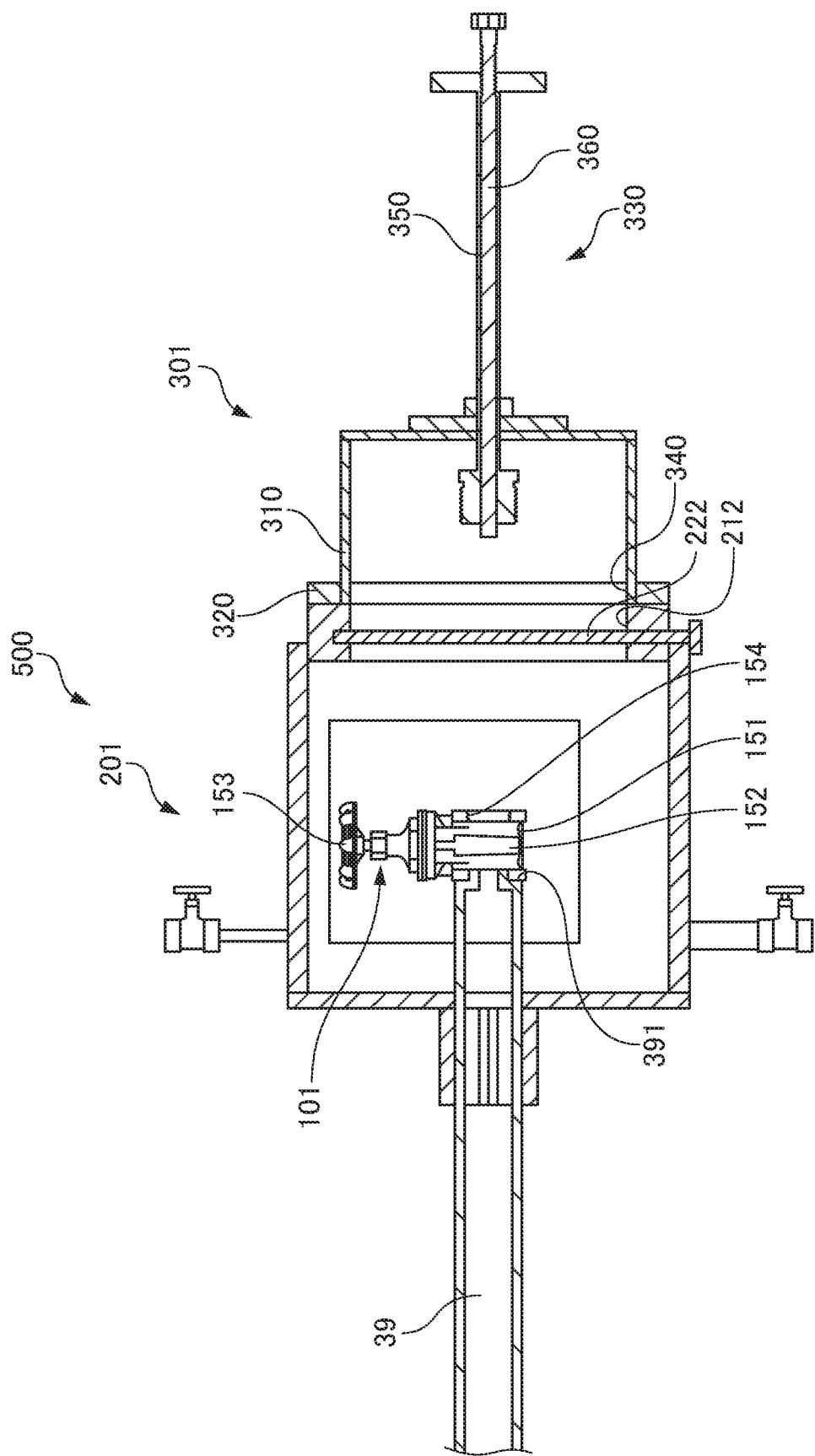
FIG. 3 is a cross-sectional view illustrating the configuration of the flow path opening/closing portion replacement device according to one embodiment of the present invention.
Figure 4A:
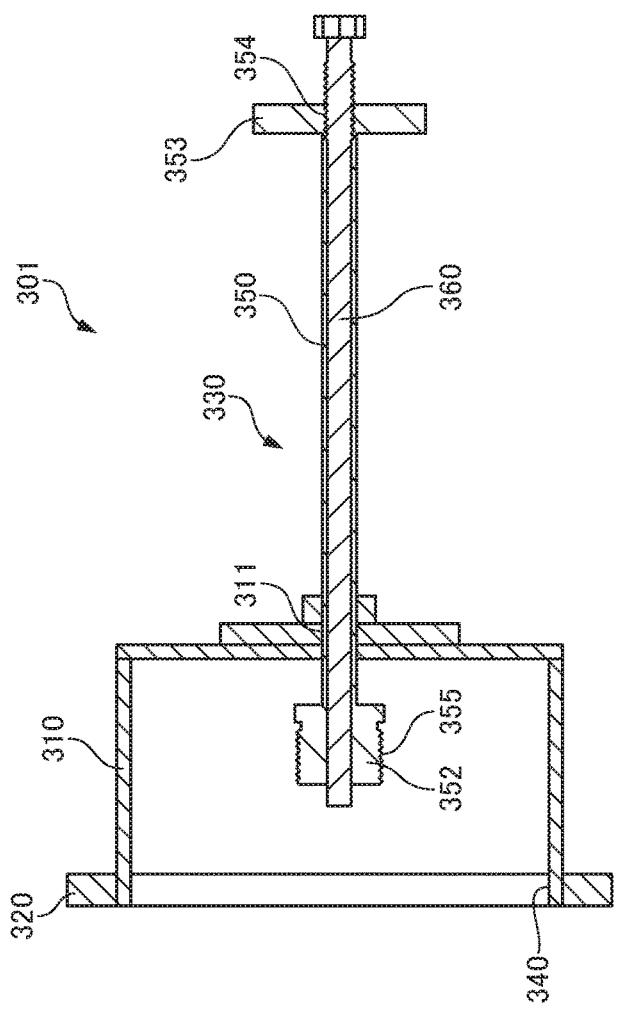
FIG. 4A is a cross-sectional view illustrating a second enclosing portion of the flow path opening/closing portion replacement device.
Figure 4B:
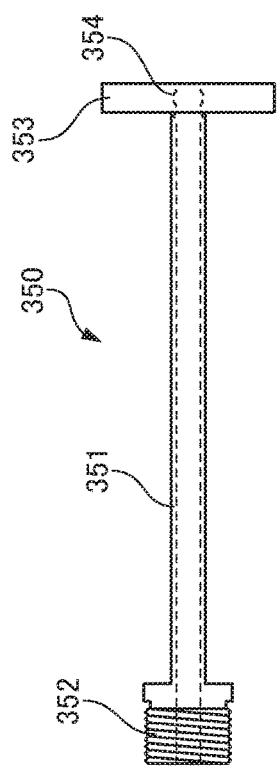
FIG. 4B a side view of a tube section of the second enclosing portion.
Figure 4C:
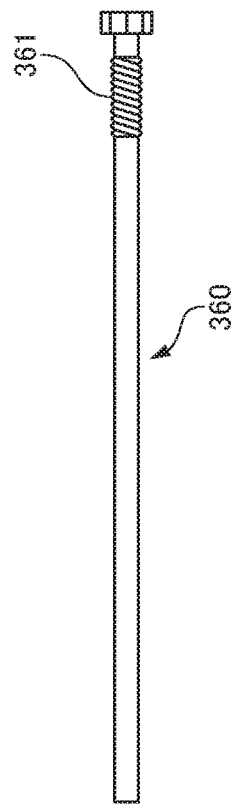
FIG. 4C is a side view of an axial portion of the second enclosing portion.
Figure 5:
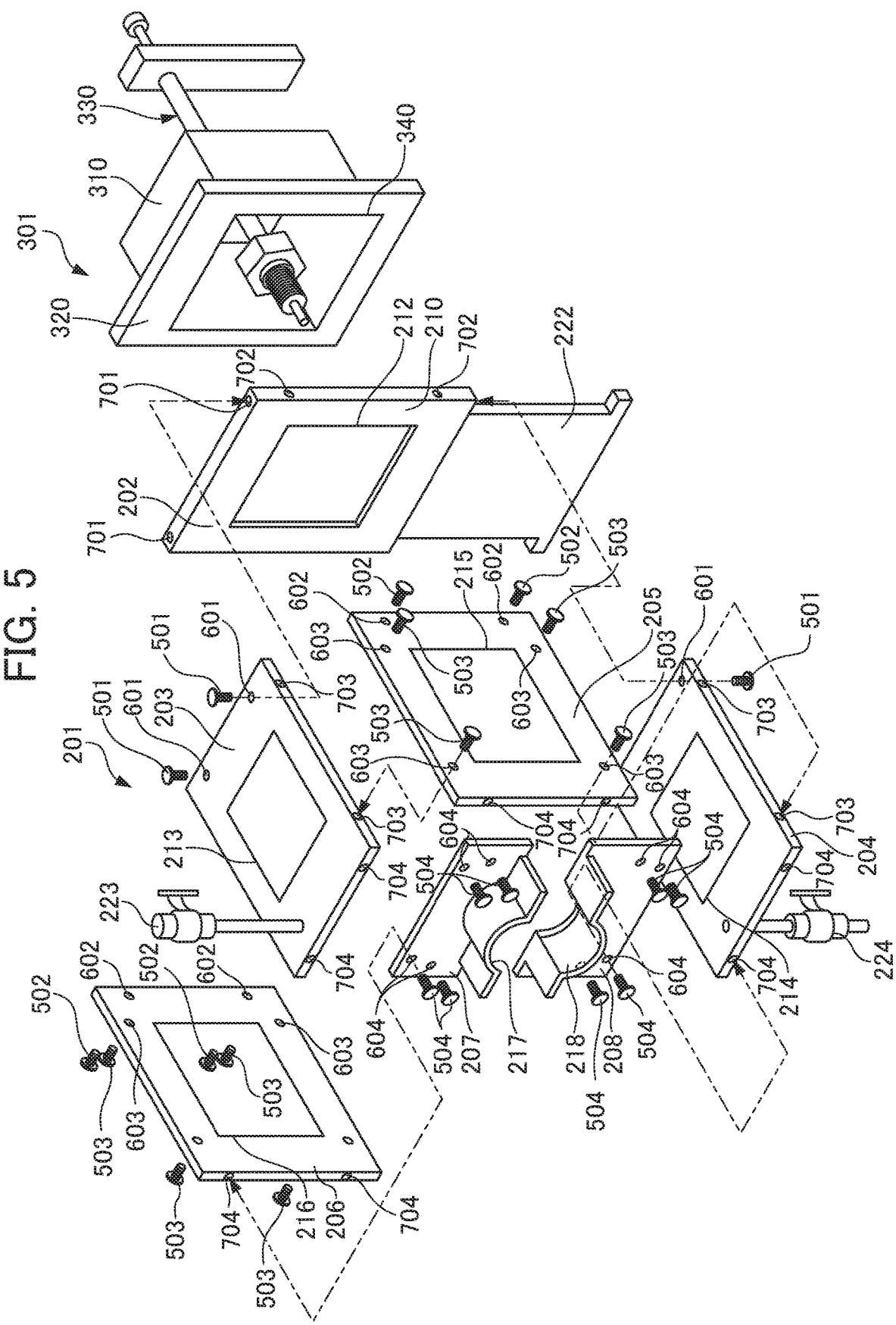
FIG. 5 is an exploded perspective view of the flow path opening/closing portion replacement device.

FIG. 3 is a cross-sectional view illustrating a configuration of the flow path opening/closing portion replacement device 500. FIGS. 4A to 4C are cross-sectional views illustrating a second enclosing portion 301 of the flow path opening/closing portion replacement device 500. FIG. 5 is an exploded perspective view of the flow path opening/closing portion replacement device 500. The flow path opening/closing portion replacement device 500 illustrated in FIG. 3 is a tool enabling an operator to replace a valve 101 by attaching another new valve 101 to the converging pipe 39 by removing an existing valve 101 from the converging pipe 39 in the state of FIG. 2.

(Flow Path Opening/Closing Portion)

As illustrated in FIG. 3, the valve 101 serving as a flow path opening/closing portion is a part which is attached to an end portion 391 of the converging pipe 39 and opens/closes the flow path of the converging pipe 39. The valve 101 includes a flow path 151, a valve body 152 that opens/closes the flow path 151, and an operating portion 153 that operates the valve body 152. A first female thread portion 154 is provided on the inner face of the flow path 151. The valve body 152 rotates so as to close the flow path 151 if the operator turns the operating portion 153 to the right. The valve body 152 rotates so as to open the flow path 151 if the operator turns the operating portion 153 to the left. The valve body 152 closes the flow path 151 before the pump unit 60 is removed as per FIG. 2, thereby preventing water in the interior of the converging pipe 39 from being discharged to the exterior of the converging pipe 39.

(Flow path Opening/Closing Portion Replacement Device)

As illustrated in FIG. 3, the flow path opening/closing portion replacement device 500 comprises a first enclosing portion 201 and a second enclosing portion 301. The first enclosing portion 201 and second enclosing portion 301 are configured from separate bodies. Note that the valve 101 can be replaced by attaching another new valve 101 to the end portion 391 of the converging pipe 39 by means of the second enclosing portion 301 (detachable member 330) which is the same as the second enclosing portion 301 (detachable member 330) from which the existing valve 101 has been removed. Furthermore, the valve 101 can also be replaced by attaching another new valve 101 to the end portion 391 of the converging pipe 39 by means of a different second enclosing portion 301 (detachable member 330) from the second enclosing portion 301 (detachable member 330) from which the existing valve 101 has been removed.

(First Enclosing Portion)

As illustrated in FIG. 5, the first enclosing portion 201 includes a side plate portion 202, an upper plate portion 203, a lower plate portion 204, a side plate portion 205, a side plate portion 206, a side plate portion 207, and a side plate portion 208. The first enclosing portion 201 includes a space for performing provisional work which is enclosed by means of these plates (202, 203, 204, 205, 206, 207, and 208). The first enclosing portion 201 according to the present embodiment is provided on the discharge side (downstream of) the pump 61 serving as a provisional pump. Because the position is a high-pressure position, a pressure resistance on the order of 1 Mpa, for example, is required for the first enclosing portion 201 according to the present embodiment. In order to secure a high pressure resistance, the first enclosing portion 201 according to the present embodiment is configured to be box-shaped and from a metal such as aluminum or an aluminum alloy as its main constituent.

First, the upper plate portion 203 and lower plate portion 204 are fixed to the side plate portion 202. That is, holes 601 which are formed in the end portion of the upper plate portion 203 and holes 601 which are formed in the end portion of the lower plate portion 204 are combined with holes 701 formed in the thick surface of the side plate portion 202, and bolts 501 are tightened in these holes 601 and 701.

Thereafter, the side plate portion 205 and side plate portion 206 are fixed to the side plate portion 202, upper plate portion 203, and lower plate portion 204. That is, holes 602 and 603 which are formed in the end portions of the side plate portion 205 and side plate portion 206 are combined with holes 702 formed in the thick surface of the side plate portion 202 and holes 703 which are formed in the thick surface of the upper plate portion 203 and lower plate portion 204, and bolts 502 and 503 are tightened in these holes 602, 603, 702, and 703.

Finally, the side plate portion 207 and side plate portion 208 are fixed to the upper plate portion 203, lower plate portion 204, side plate portion 205, and side plate portion 206. That is, holes 604 which are formed in the end portions of the side plate portion 207 and side plate portion 208 are combined with holes 704 formed in the thick surface of the upper plate portion 203, lower plate portion 204, side plate portion 205, and side plate portion 206, and bolts 504 are tightened in these holes 604 and 704.

The side plate portion 202 includes a plate main body 210, a first opening 212, and a shutter 222. The plate main body 210 is a housing that enables the shutter 222 to be inserted from below. The first opening 212 is open in a state where the shutter 222 has been drawn from the plate main body 210 and is closed in a state where the shutter 222 is stored in the interior of the plate main body 210. The shutter 222 is a member which is capable of opening closing the first opening 212.

The upper plate portion 203 includes a window 213 for confirming the state of water stored in the first enclosing portion 201. The window is formed of acrylic. The upper plate portion 203 includes an air release valve 223 for releasing air. The lower plate portion 204 includes a window 214 for confirming the state of water stored in the first enclosing portion 201. The window is formed of acrylic. The lower plate portion 204 includes a water release valve 224 for releasing water.

The side plate portion 205 and side plate portion 206 include windows 215 and 216 for confirming the state of water stored in the first enclosing portion 201. The window is formed of acrylic.

The side plate portion 207 and side plate portion 208 are parts that cover from one direction like the other side plate portions, by means of these two plates. The upper side side plate portion 207 includes a piping insertion portion 217. The lower side side plate portion 208 includes a piping insertion portion 218. The converging pipe 39 is fixed to the side plate portions 207 and 208 as a result of the piping insertion portion 217 and piping insertion portion 218 sandwiching the converging pipe 39.

The first enclosing portion 201 encloses the end portion 391 of the converging pipe 39 and the valve 101 in a state where the shutter 222 has closed the first opening 212.

(Second Enclosing Portion)

The second enclosing portion 301 includes a bottomed cylindrical body 310, a flange portion 320, and a detachable member 330. The second enclosing portion 301 is a part that encloses the valve 101 in conjunction with the first enclosing portion 201 in an opening connection state where the first opening 212 and second opening 340 are connected.

(Bottomed Cylindrical Body)

The bottomed cylindrical body 310 is a cylindrical member with a bottom and includes an insertion hole 311 into which the detachable member 330, described subsequently, is inserted, and a second opening 340 which enables the tip side of the detachable member 330 to be inserted and removed. In addition, the second opening 340 is an opening which can be contiguous with the first opening 212.

(Flange Portion)

The flange portion 320 is provided so as to extend outward, in a direction orthogonal to the axial direction of an axial portion 360, from the end portion of the bottomed cylindrical body 310. The flange portion 320 is configured to be connectable to the plate main body 210 of the side plate portion 202 of the first enclosing portion 201 described previously.

(Detachable Member)

The detachable member 330 is a member enabling the valve 101 to be detached. The detachable member 330 includes a tube section 350 and the axial portion 360.

(Tube Section)

The tube section 350 includes an insertion portion 351, a tip portion 352, and a handle portion 353. The insertion portion 351 is inserted in the insertion hole 311 of the bottomed cylindrical body 310 and is supported by the bottomed cylindrical body 310 so as to enable modification of its position with respect to the bottomed cylindrical body 310. The tip portion 352 is disposed at the tip of the insertion portion 351. A first male thread portion 355 capable of being threaded into the first female thread portion 154 of the valve 101 is provided on the outer face of the tip portion 352. The tip portion 352 can be disposed in a retractable position so as to be retracted to the interior of the bottomed cylindrical body 310, and can also be disposed in a protrusion position so as to protrude to the exterior of the bottomed cylindrical body 310. The handle portion 353 is disposed at the base end of the insertion portion 351. The handle portion 353 causes the tube section 350 to be fixed to the valve 101 as a result of the first male thread portion 355 of the tip portion 352 rotating to the right in a state of contacting the first female thread portion 154 of the valve 101. A second female thread portion 354 is provided on the inner face of a rear end portion which includes the handle portion 353.

(Axial Portion)

The axial portion 360 is a part which is inserted into the interior of the tube section 350 and which enables an increase in the protrusion distance from the tip portion of the tube section 350. A second male thread portion 361 capable of being threaded into the second female thread portion 354 is provided on the outer face of the rear end portion of the axial portion 360. When the axial portion 360 is rotated to the right, the second male thread portion 361 of the axial portion 360 advances relative to the second female thread portion 354 of the tube section 350, and there is an increase in the protrusion distance at which the tip of the axial portion 360 protrudes from the tip portion 352 of the tube section 350. When the axial portion 360 is rotated to the left, the second male thread portion 361 of the axial portion 360 retreats relative to the second female thread portion 354 of the tube section 350, and there is a decrease in the protrusion distance at which the tip of the axial portion 360 protrudes from the tip portion 352 of the tube section 350.

A method for using the flow path opening/closing portion replacement device will be described next with reference to FIGS. 6A to 13B. As illustrated in FIG. 6A, the valve 101 is attached to an end portion 391 of the converging pipe 39. The valve body 152 of the valve 101 stops the flow of water by closing the flow path 151.

(Enclosing Step)

As illustrated in FIG. 6B, the operator encloses the end portion 391 of the converging pipe 39 and an existing valve 101 by means of the first enclosing portion 201. At this time, the shutter 222 closes the first opening 212. The interior of the first enclosing portion 201 is filled with air but not yet filled with water.

(Flow Path Opening/Closing Portion Removal Step)

Figure 7A:
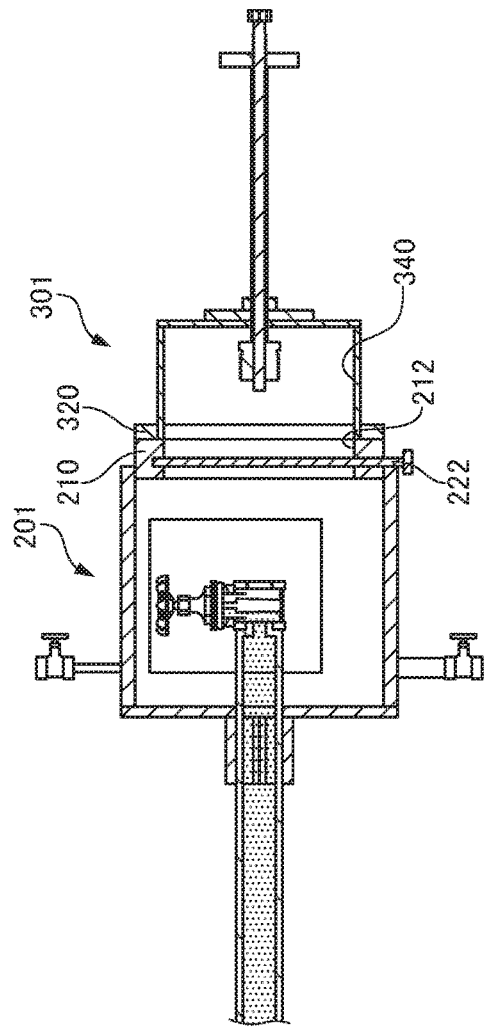
FIG. 7A is a cross-sectional view illustrating a state in which a second enclosing portion is attached to the first enclosing portion.
Figure 7B:
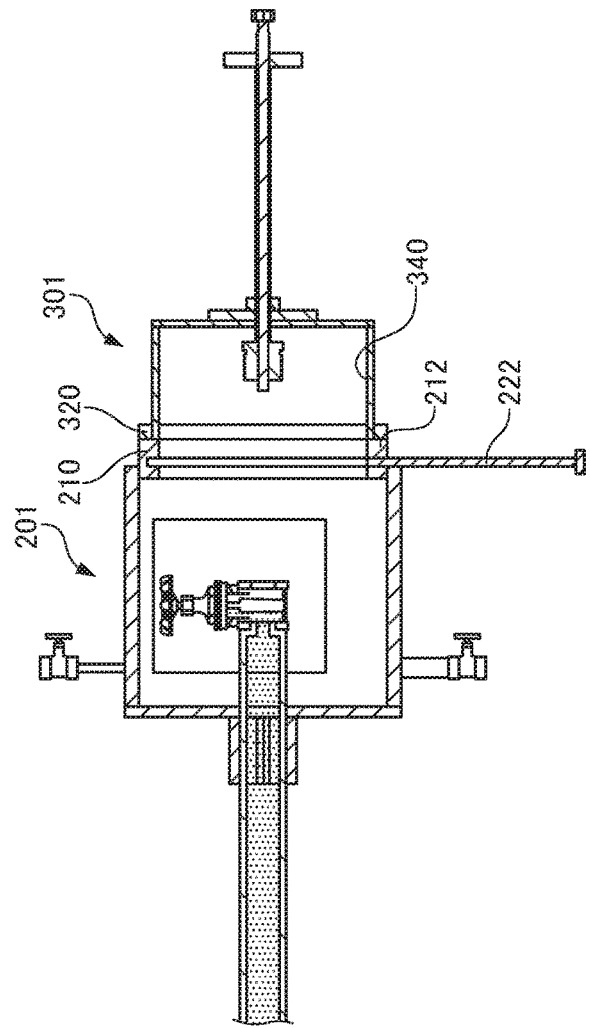
FIG. 7B is a cross-sectional view illustrating a state in which a first opening is opened by moving a shutter.

As illustrated in FIG. 7A, the operator makes the second opening 340 contiguous with the first opening 212 by connecting the flange portion 320 of the second enclosing portion 301 to the plate main body 210 of the first enclosing portion 201. Thereafter, as illustrated in FIG. 7B, the operator opens the first opening 212 by moving the shutter 222. A contiguous opening state is thus formed.

Figure 8A:
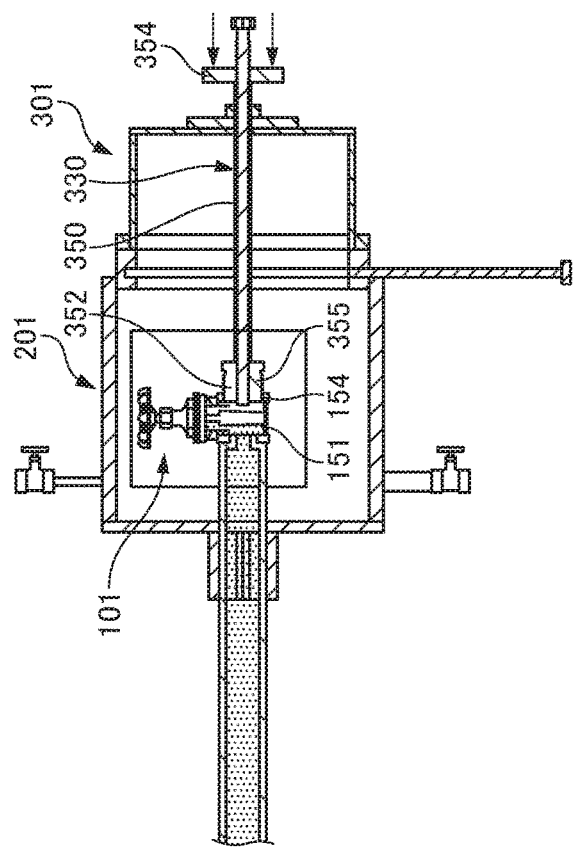
FIG. 8A is a cross-sectional view illustrating a state in which the tube section of the second enclosing portion is engaged with a flow path of the valve.

As illustrated in FIG. 8A, the operator grasps the handle portion 353 and causes the tip side of the detachable member 330 to move from the interior of the second enclosing portion 301 to the interior of the first enclosing portion 201. The operator causes the first male thread portion 355 of the tip portion 352 of the tube section 350 to be threaded into the first female thread portion 154 of the flow path 151 of the valve 101 by rotating the tube section 350 to the right. The tube section 350 is thus fixed to the flow path 151.

Figure 8B:
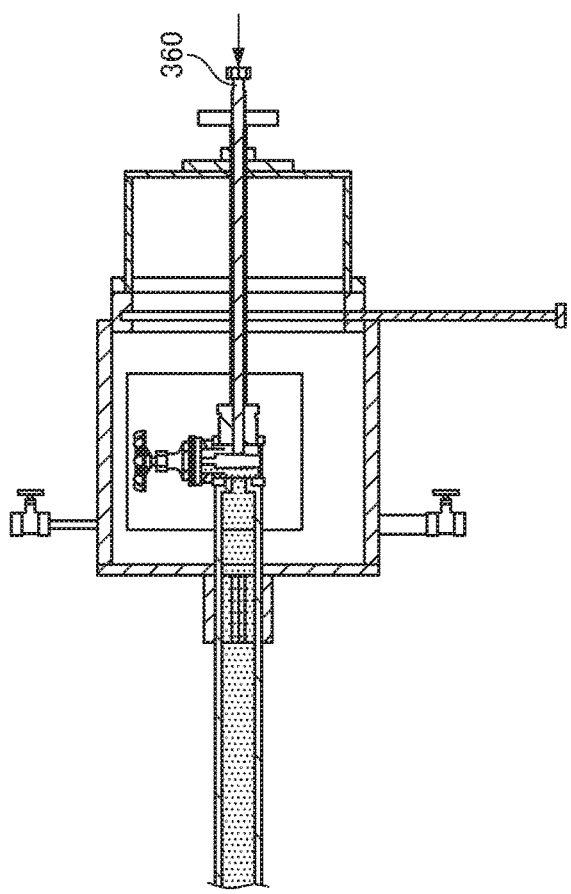
FIG. 8B is a cross-sectional view illustrating a state in which the axial portion of the second enclosing portion is pressing the valve body of the valve.

As illustrated in FIGS. 8B and 9A, the operator grasps the axial portion 360 and rotates the axial portion 360 to the right. As the protrusion distance at which the axial portion 360 protrudes from the tip portion of the tube section 350 increases, the axial portion 360 abuts the valve body 152, and the pressure with which the axial portion 360 presses the valve body 152 increases.

As illustrated in FIG. 9B, the operator rotates the tube section 350 to the left while the axial portion 360 continues to apply pressure to the valve body 152. The detachable member 330 and valve 101 rotate integrally to the left. The valve 101 is removed from the end portion 391 of the converging pipe 39. The operator thus removes the detachable member 330 from the end portion 391 of the converging pipe 39 by moving the existing valve 101 from the end portion 391 of the converging pipe 39 to the detachable member 330. At the same time, water in the interior of the converging pipe 39 fills the interiors of the first enclosing portion 201 and second enclosing portion 301.

(Flow Path Opening/Closing Portion Extraction Step)

As illustrated in FIG. 10A, the operator causes the existing valve 101 and the tip side of the detachable member 330 to be retracted from the interior of the first enclosing portion 201 to the interior of the second enclosing portion 301 in a state where the interiors of the first enclosing portion 201 and second enclosing portion 301 are filled with water that passes through the opened converging pipe 39.

As illustrated in FIG. 10B, the operator closes the first opening 212 by pushing the shutter 222. As illustrated in FIG. 11A, the operator withdraws the existing valve 101 and second enclosing portion 301 from the first enclosing portion 201 and extracts the existing valve 101 from the interior of the first enclosing portion 201 to the exterior of the first enclosing portion 201.

(Flow Path Opening/Closing Portion Insertion Step)

As illustrated in FIG. 11B, the operator attaches another new valve 101 which is interchangeable with the existing valve 101 to the tip side of the detachable member 330.

As illustrated in FIG. 12A, the operator makes the second opening 340 contiguous with the first opening 212 and then moves the shutter 222 to open the first opening 212. The operator inserts the new valve 101 into the interior of the first enclosing portion 201 from the interior of the second enclosing portion 301.

(Flow Path Opening/Closing Portion Attachment Step)

The operator then moves the new valve 101 close to the converging pipe 39 and causes the tube section 350 to rotate to the right by rotating the handle portion 353 to the right. The operator thus attaches the new valve 101 to the end portion 391 of the converging pipe 39.

(Enclosure Release Step)

As illustrated in FIGS. 12B and 13A, the operator rotates the axial portion 360 to the left so as to cause the axial portion 360 to be retracted from the tip of the tube section 350. The pressure of the axial portion 360 against the valve body 152 is then released.

As illustrated in FIG. 13B, the operator removes the tube section 350 from the flow path 151 while rotating the tube section 350 to the left and without rotating the valve 101. Thereafter, the operator causes the tip side of the detachable member 330 to be retracted from the end portion of the converging pipe 39. The operator releases water after opening the water release valve 224. The operator then closes the first opening 212 by moving the shutter 222. Note that the shutter 222 needs not be closed.

The operator finally releases the enclosure by removing the first enclosing portion 201 and second enclosing portion 301. A state where the valve 101 has been renewed is thus assumed in FIG. 6A.

The flow path opening/closing portion replacement device 500 according to the present embodiment affords the following effects, for example. The flow path opening/closing portion replacement device 500 according to the present embodiment comprises a first enclosing portion 201 having a first opening 212 and a shutter 222 capable of opening/closing the first opening 212, and enclosing, in a state where the shutter 222 has closed the first opening 212, an end portion of a converging pipe 39 enabling a fluid to pass and a valve 101 which is attached to the end portion 391 of the converging pipe 39 and opens/closes a flow path 151 of the converging pipe 39; a second enclosing portion 301 having a detachable member 330 enabling the valve 101 to be detached and a second opening 340 which can be contiguous with the first opening 212 and enabling removal/insertion of the detachable member 330, and enclosing the valve 101 together with the first enclosing portion 201 in a contiguous opening state in which the first opening 212 and the second opening 340 are contiguous, wherein, in a state where the second enclosing portion 301 has enclosed the valve 101 together with the first enclosing portion 201 in the contiguous opening state, an existing valve 101 can be replaced with another valve 101 by means of the detachable member 330.

Therefore, in a state where the valve 101 stops water in the converging pipe 39 from being discharged, it is possible to reduce the amount of water discharged from the converging pipe 39 when an existing valve 101 is exchanged for another valve 101.

In addition, in the flow path opening/closing portion replacement device 500 according to the present embodiment, the valve 101 includes a flow path 151 and a valve body 152 that opens/closes the flow path 151, the detachable member 330 includes a tube section 350 and an axial portion 360 which is inserted into the interior of the tube section 350 and enables a protrusion distance from a tip portion of the tube section 350 to be increased, the tube section 350 is fixed to the flow path 151, and, when the detachable member 330 and the valve 101 rotate integrally while the axial portion 360 is made to press the valve body 152 by increasing the protrusion distance at which the axial portion 360 protrudes from the tip portion of the tube section 350, the valve 101 can be removed from the converging pipe 39. Therefore, even when water has filled the first enclosing portion 201 and second enclosing portion 301, the operator is able to replace the valve 101 without putting their hands inside the first enclosing portion 201 and second enclosing portion 301.

Furthermore, in the flow path opening/closing portion replacement device 500 according to the present embodiment, a first female thread portion 154 may be provided on the inner face of the flow path 151, a first male thread portion 355 capable of being threaded into the first female thread portion 154 may be provided on the outer face of the tip portion of the tube section 350, a second female thread portion 354 may be provided on the inner face of a rear end portion of the tube section 350, and a second male thread portion 361 capable of being threaded into the second female thread portion 354 may be provided on the outer face of the rear end portion of the axial portion 360. Therefore, the operator is able to finely adjust the length of the axial portion 360 which protrudes from the tip portion of the tube section 350 by means of the pitch of the thread, and is able to finely adjust the pressure which the axial portion 360 applies to the valve body 152.

(Modification Example)

An embodiment of the present invention has been described hereinabove. In the embodiment, the valve 101 employs a screw-in method in which the converging pipe 39 is screwed. The present invention is not limited to or by this embodiment, and may be configured such the valve is provided with a flange, the piping is provided with a flange, and the valve flange and piping flange are connected by means of bolts or the like. The flow path opening/closing portion may be an element other than a valve.

In the embodiment, a method in which the valve 101 is removed from the converging pipe 39 is described. The present invention is not limited to or by this embodiment, rather, the flow path opening/closing portion replacement device 500 may be employed also in a method in which the first-stage valves 21 to 24 are removed from the first-stage parallel pipes 11 to 14. The first enclosing portion 201 can be provided on an inlet side (upstream side) of the pump 61 serving as a provisional pump. Because that position of the first enclosing portion 201 is a relatively low-pressure position, a high pressure resistance is not required for the first enclosing portion 201. For example, the first enclosing portion 201 may be formed in a bag shape and of a flexible material such as tent cloth and can be configured to enable the operator to work by inserting their hands into the interior of the first enclosing portion 201. In this case, the manufacturing costs and operating costs of the first enclosing portion 201 can be reduced and work can be performed rapidly.

The description of the present embodiment has been provided using water as an example of the fluid. The present invention is not limited to or by this embodiment, rather, another liquid other than water could also be used as the fluid. Moreover, a gas may be used as the fluid.

EXPLANATION OF REFERENCE NUMERALS

39: Converging pipe
101: Valve (Flow path opening/closing portion)
151: Flow path
152: Valve body
153: Operating portion
154: First female thread portion
201: First enclosing portion
210: Plate main body
212: First opening
222: Shutter
223: Air release valve
224: Water release valve
301: Second enclosing portion
310: Bottomed cylindrical body
320: Flange portion
330: Detachable member
340: Second opening
350: Tube section
351: Insertion portion
352: Tip portion
353: Handle portion
354: Second female thread portion
355: First male thread portion.
360: Axial portion
361: Second male thread portion
391: End portion
500: Flow path opening/closing portion replacement device

What is claimed is:

1. A flow path opening/closing portion replacement device, comprising:
a first enclosing portion having a first opening and a shutter capable of opening/closing the first opening, the first enclosing portion being configured to enclose, in a state where the shutter has closed the first opening, an end portion of piping enabling a fluid to pass and a flow path opening/closing portion which is configured to attach to the end portion of the piping and cause the fluid introduced from the piping to pass or stop; and
a second enclosing portion having:
a detachable member enabling the flow path opening/closing portion to attach to or detach from the end portion of the piping; and
a second opening which is configured to be contiguous with the first opening and enable removal/insertion of the detachable member,
the second enclosing portion being configured to enclose the flow path opening/closing portion together with the first enclosing portion in a contiguous opening state of the first opening and the second opening being contiguous with each other,
wherein, in a state where the second enclosing portion has enclosed the flow path opening/closing portion together with the first enclosing portion in the contiguous state, the flow path opening/closing portion is replaceable with another flow path opening/closing portion by the detachable member.

2. The flow path opening/closing portion replacement device according to claim 1, wherein the flow path opening/closing portion includes a flow path and a valve body that opens/closes the flow path,
wherein the detachable member includes a tube section and an axial portion which is inserted into an interior of the tube section and enables a protrusion distance from a tip portion of the tube section to be increased, and
wherein the tube section is fixed to the flow path of the flow path opening/closing portion, and when the detachable member and the flow path opening/closing portion rotate integrally while the axial portion is made to press the valve body by increasing the protrusion distance at which the axial portion protrudes from the tip portion of the tube section, the flow path opening/closing portion is removable from the piping.

3. The flow path opening/closing portion replacement device according to claim 2, wherein a first female thread portion is provided on an inner face of the flow path of the flow path opening/closing portion,
wherein a first male thread portion capable of being threaded into the first female thread portion is provided on an outer face of the tip portion of the tube section,
wherein a second female thread portion is provided on an inner face of a rear end portion of the tube section, and
wherein a second male thread portion capable of being threaded into the second female thread portion is provided on an outer face of a rear end portion of the axial portion.

4. A method for using the flow path opening/closing portion replacement device according to claim 1, comprising:

an enclosing step of enclosing the end portion of the piping and the flow path opening/closing portion by the first enclosing portion in a state where the shutter has closed the first opening;

a flow path opening/closing portion removal step of opening the shutter after making the second opening contiguous with the first opening, causing a tip side of the detachable member to move from an interior of the second enclosing portion to an interior of the first enclosing portion, and removing the flow path opening/closing portion from the end portion of the piping by moving the flow path opening/closing portion from the end portion of the piping to the detachable member;

a flow path opening/closing portion extraction step of causing the flow path opening/closing portion and the tip side of the detachable member to be retracted to the second enclosing portion in a state where the interiors of the first enclosing portion and the second enclosing portion are filled with the fluid that has passed through the piping which has been freed in the flow path opening/closing portion removal step, withdrawing the flow path opening/closing portion and the second enclosing portion from the first enclosing portion, and extracting the flow path opening/closing portion from the interior of the first enclosing portion to an exterior of the first enclosing portion;

an insertion step of attaching another flow path opening/closing portion which is interchangeable with the flow path opening/closing portion to the tip side of the detachable member or of another detachable member which is interchangeable with the detachable member, opening the shutter after making the second opening contiguous with the first opening, and inserting the other flow path opening/closing portion from the interior of the second enclosing portion to the interior of the first enclosing portion;

a flow path opening/closing portion attachment step of attaching the other flow path opening/closing portion to the end portion of the piping; and an enclosure release step of causing the tip side of the detachable member to be retracted from the end portion of the piping and removing the first enclosing portion and the second enclosing portion.

5. A method for replacing a flow path opening/closing portion, comprising:

an enclosing step of enclosing, by an enclosing portion having a space for performing provisional work, an end portion of piping enabling a fluid to pass and a flow path opening/closing portion which is configured to attach to the end portion of the piping and cause the fluid introduced from the piping to pass or stop;

a flow path opening/closing portion removal step of removing the flow path opening/closing portion from the end portion of the piping;

a flow path opening/closing portion extraction step of extracting the flow path opening/closing portion from an interior of the enclosing portion to an exterior of the enclosing portion in a state where the interior of the enclosing portion is filled with the fluid that has passed through the piping which has been freed in the flow path opening/closing portion removal step;

a flow path opening/closing portion insertion step of inserting another flow path opening/closing portion, which is interchangeable with the flow path opening/closing portion, while the interior of the enclosing portion remains filled with the fluid;

a flow path opening/closing portion attachment step of attaching the other flow path opening/closing portion to the end portion of the piping; and an enclosure release step of removing the enclosing portion.

\* \* \* \* \*